US012059030B2

(12) United States Patent
Van Lancker et al.

(10) Patent No.: US 12,059,030 B2
(45) Date of Patent: Aug. 13, 2024

(54) RETRACTABLE HEATER FOR AEROSOL-GENERATING DEVICE

(71) Applicant: Philip Morris Products S.A., Neuchatel (CH)

(72) Inventors: Pieter Van Lancker, Kortrijk (BE); Louis-Philippe Vancraeynest, Kortrijk (BE); Simon Desnerck, Kortrijk (BE)

(73) Assignee: Philip Morris Products S.A., Neuchatel (CH)

( * ) Notice: Subject to any disclaimer, the term of this patent is extended or adjusted under 35 U.S.C. 154(b) by 881 days.

(21) Appl. No.: 16/973,594

(22) PCT Filed: Jun. 13, 2019

(86) PCT No.: PCT/EP2019/065466

§ 371 (c)(1),
(2) Date: Dec. 9, 2020

(87) PCT Pub. No.: WO2019/238812

PCT Pub. Date: Dec. 19, 2019

(65) Prior Publication Data

US 2021/0244096 A1 Aug. 12, 2021

(30) Foreign Application Priority Data

Jun. 14, 2018 (EP) .................................... 18177745

(51) Int. Cl.
*A24F 40/46* (2020.01)
*A24F 40/50* (2020.01)
(Continued)

(52) U.S. Cl.
CPC .............. *A24F 40/46* (2020.01); *A24F 40/50* (2020.01); *A24F 40/60* (2020.01); *A24F 40/85* (2020.01); *H05B 3/42* (2013.01); *A24F 40/20* (2020.01)

(58) Field of Classification Search
CPC .......... A24F 40/46; A24F 40/85; A24F 40/50; A24F 40/60; A24F 40/20; H05B 3/42
See application file for complete search history.

(56) References Cited

U.S. PATENT DOCUMENTS 6,053,176 A * 4/2000 Adams .................... A24F 40/53 131/329
9,591,876 B2 * 3/2017 Alima ..................... A24F 40/46
(Continued)

FOREIGN PATENT DOCUMENTS

CN 103987286 A 8/2014
CN 104105417 A 10/2014
(Continued)

OTHER PUBLICATIONS

Japanese Office Action issued Jan. 26, 2022 in Japanese Patent Application No. 2020-568789 (submitting English translation only), 5 pages.

(Continued)

*Primary Examiner* — Thanh Tam T Le
(74) *Attorney, Agent, or Firm* — Oblon, McClelland, Maier & Neustadt, L.L.P.

(57) ABSTRACT

An aerosol-generating device for generating an inhalable aerosol, the aerosol-generating device including: a housing; a heating chamber configured to receive an aerosol-generating article containing an aerosol-generating substrate; and a heating element disposed in the heating chamber and being configured to be arranged in a first position, in which the heating element penetrates the aerosol-generating substrate, and in a second position, in which the heating element is at least partly retracted from the heating chamber, and being further configured to move, during retraction from the heating chamber, relative to the housing. A method for
(Continued)

retracting a heating element from a heating chamber of an aerosol-generating device is also provided.

17 Claims, 5 Drawing Sheets

(51) Int. Cl.

| | |
|---|---|
| ***A24F 40/60*** | (2020.01) |
| ***A24F 40/85*** | (2020.01) |
| ***H05B 3/42*** | (2006.01) |
| *A24F 40/20* | (2020.01) |

(56) References Cited

U.S. PATENT DOCUMENTS

| | | | | |
|---|---|---|---|---|
| 9,693,587 | B2 * | 7/2017 | Plojoux | A61M 15/06 |
| 9,814,263 | B2 * | 11/2017 | Cochand | A61M 15/06 |
| 10,757,978 | B2 * | 9/2020 | Bessant | A24F 40/46 |
| 10,925,321 | B2 * | 2/2021 | Ouyang | A24F 40/40 |
| 10,952,471 | B2 * | 3/2021 | Batista | F22B 1/284 |
| 10,986,869 | B2 * | 4/2021 | Zinovik | H05B 6/105 |
| 11,045,615 | B2 * | 6/2021 | Reevell | A24F 40/42 |
| 11,559,082 | B2 * | 1/2023 | Chen | A24F 40/40 |
| 2010/0024834 | A1 | 2/2010 | Oglesby et al. | |
| 2015/0013696 | A1 | 1/2015 | Plojoux et al. | |
| 2015/0181935 | A1 | 7/2015 | Lyubomirskiy et al. | |
| 2015/0217064 | A1 | 8/2015 | Trzecieski | |
| 2017/0049153 | A1 * | 2/2017 | Guo | H05B 3/18 |
| 2017/0055580 | A1 | 3/2017 | Blandino et al. | |
| 2017/0172215 | A1 | 6/2017 | Li et al. | |
| 2018/0049471 | A1 | 2/2018 | Holoubek et al. | |
| 2020/0163380 | A1 | 5/2020 | Lee et al. | |

FOREIGN PATENT DOCUMENTS

| | | | |
|---|---|---|---|
| CN | 105934166 | A | 9/2016 |
| CN | 106535680 | A | 3/2017 |
| CN | 106617324 | A | 5/2017 |
| CN | 107105777 | A | 8/2017 |
| EP | 3 179 828 | A1 | 6/2017 |
| EP | 3 804 546 | A1 | 4/2021 |
| JP | 3-277265 | A | 12/1991 |
| JP | 2020-516261 | A | 6/2020 |
| KR | 10-2014-0092312 | A | 7/2014 |
| KR | 10-2018-0033295 | A | 4/2018 |
| NZ | 262292 | A | 8/1997 |
| RU | 2 604 012 | C2 | 12/2016 |
| RU | 2 611 487 | C2 | 2/2017 |
| RU | 2 617 297 | C2 | 4/2017 |
| WO | WO 2013/098410 | A2 | 7/2013 |
| WO | WO 2016/120177 | A1 | 8/2016 |
| WO | WO 2016/156497 | A1 | 10/2016 |
| WO | WO 2017/036950 | A2 | 3/2017 |
| WO | WO 2018/190603 | A1 | 10/2018 |
| WO | WO 2019/030166 | A1 | 2/2019 |
| WO | WO 2019/030172 | A1 | 2/2019 |
| WO | WO 2019/224069 | A1 | 11/2019 |

OTHER PUBLICATIONS

Decision to Grant issued Jul. 5, 2021 in Russian Patent Application No. 2021100161 (submitting English translation only), 6 pages.
Korean Office Action issued on Nov. 23, 2022 in Korean Patent Application No. 10-2020-7033748 (with English translation), 10 pages.
International Search Report and Written Opinion issued on Aug. 13, 2019 in PCT/EP2019/065466 filed on Jun. 13, 2019.
Combined Chinese Office Action and Search Report issued Aug. 16, 2023 in Chinese Patent Application No. 201980034432.5 (with English Translation), 15 pages.
Chinese Office Action and Search Report issued on Feb. 15, 2023, in Chinese Patent Application No. 201980034432.5 (with English Translation) 19 pages.
Combined Chinese Office Action and Search Report issued Dec. 27, 2023 in Chinese Patent Application No. 201980034432.5 (with English Translation), 19 pages.
European Office Action mailed on Jan. 18, 2024 in European Patent Application No. 19731666.4 filed on Jun. 13, 2019, total 7 pages.

* cited by examiner

Fig. 1
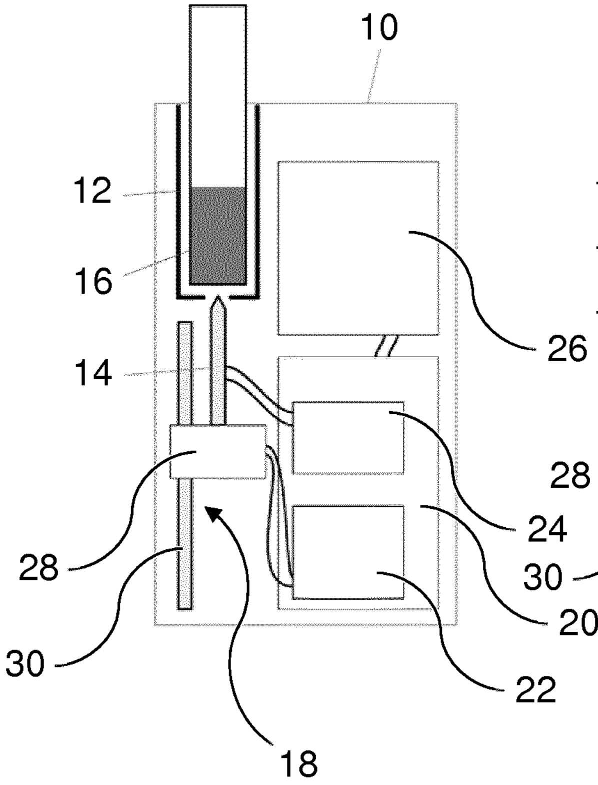
Fig. 1A
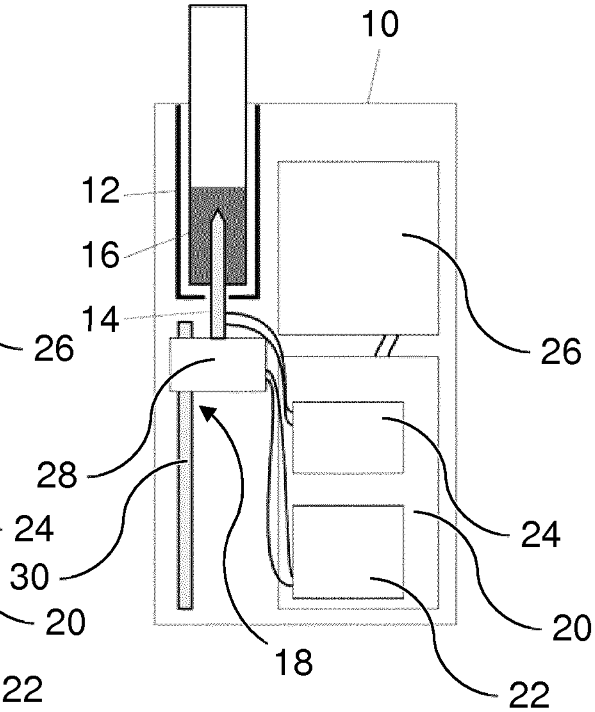
Fig. 1B 10
14
16
20
22
24
26
28
30
34
36
38

RETRACTABLE HEATER FOR AEROSOL-GENERATING DEVICE

CROSS-REFERENCE TO RELATED APPLICATIONS

This application is a U.S. national stage application of PCT/EP2019/065466, filed on Jun. 13, 2019, which is based upon and claims the benefit of priority under 35 U.S.C. § 119 from European patent application no. 18177745.9, filed Jun. 14, 2018, the entire contents of each of which are incorporated herein by reference.

TECHNICAL FIELD

The invention relates to an aerosol-generating device for generating an inhalable aerosol. Aerosol-generating devices are known which heat but not burn aerosol-generating substrate such as tobacco. These devices heat aerosol-generating substrate to a sufficiently high temperature for creating an aerosol for inhalation by the user.

DESCRIPTION OF THE RELATED ART

These aerosol-generating devices typically comprise a heating chamber, wherein a heating element is arranged within the heating chamber. An aerosol-generating article comprising aerosol-generating substrate can be inserted into the heating chamber and heated by the heating element. After an aerosol-generating article is depleted, the aerosol-generating article is removed from the heating chamber and a fresh aerosol-generating article is inserted. Aerosol-generating articles are pushed over the heating element and the heating element consequently penetrates into the aerosol-generating substrate of the aerosol-generating article. During removal of aerosol-generating articles, unwanted residues of the aerosol-generating substrate may remain in the heating chamber and stick to the heating element.

Consequently, there is a need for an aerosol-generating device which reduces or eliminates unwanted residues in the heating chamber and on the heating element.

SUMMARY

For solving this and further objects, the present invention proposes an aerosol-generating device for generating an inhalable aerosol. The device comprises a housing, a heating chamber configured to receive an aerosol-generating article containing aerosol-generating substrate and a heating element. The heating element is arranged in the heating chamber. The heating element is configured to be arranged in a first position, in which the heating element penetrates the aerosol-generating substrate, and configured to be arranged in a second position, in which the heating element is at least partly retracted from the heating chamber. The heating element is configured to move, during retraction from the heating chamber, relative to the housing.

BRIEF DESCRIPTION OF THE DRAWINGS

The invention will be described in more detail in the following with reference to the accompanying drawings, which show in:

FIG. 1: an aerosol-generating device according to the present invention with a retracted and pushed heating element;

DETAILED DESCRIPTION

Figures 2, 2A, 2B, 2C, 2D, 2E:
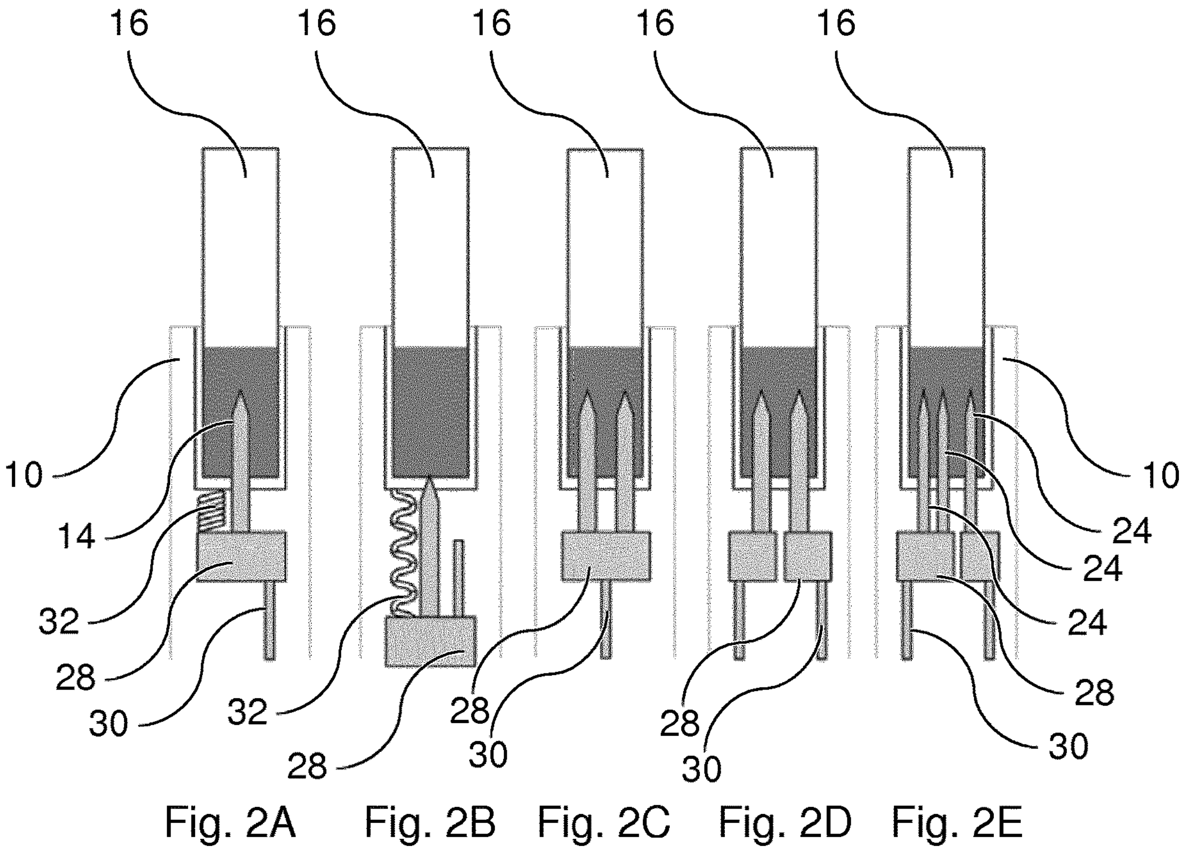
FIG. 2: the aerosol-generating device according to the present invention with different configurations of a retraction mechanism and of heating elements.

By configuring the heating element retractable, the heating element can be retracted from the heating chamber before an aerosol-generating article comprising aerosol-generating substrate is removed from the heating chamber. In this regard, the aerosol-generating article may leave residues of aerosol-generating substrate during removal of the article in the heating chamber and on the heating element in conventional devices.

Particularly, the heating element of the aerosol-generating device may be configured as a heating pin or heating blade which penetrates into the aerosol-generating substrate of the aerosol-generating article. Consequently, the aerosol-generating article is pushed over the heating element during insertion of the aerosol-generating article into the heating chamber and pulled out of the heating chamber, when the substrate is depleted. The pulling of the aerosol-generating article off of the heating element may loosen small crumbs or other material from the aerosol-generating substrate. These residues may be unwanted and may adhere to the walls of the heating chamber and the heating element after removal of the aerosol-generating article. The present invention enables the heating element to be retracted from the heating chamber so that the aerosol-generating article can be removed by a user easily, while at the same time reducing or preventing residues of the aerosol-generating substrate from remaining in the heating chamber and on the heating element.

The term "retractable" denotes a movement of the heating element so that the heating element is moved from the first position in which the heating element is arranged in the heating chamber to the second position in which the heating element is essentially no longer arranged in the heating chamber. In this regard, the heating element may be fully retracted from the heating chamber. The heating element may also be partly retracted from the heating chamber. In this regard, the heating element is at least retracted 50% from the heating chamber. This means that 50% of the heating element that is positioned in the heating chamber in the first position is no longer positioned in the heating chamber in the second position. Preferably, 70%, 80% or at least 90% of the heating element is retracted from the heating chamber in the second position of the heating element.

The aerosol-generating device comprises a housing. The housing may be a solid housing. The housing may be an outer housing. All components of the aerosol-generating device may be housed in the housing. All components of the aerosol-generating device may be surrounded by the housing. The housing may cover all components of the aerosol-generating device. The heating chamber is preferably arranged in the housing. The housing may comprise further elements such as a power supply and a controller as described in more detail below. During retraction of the heating element, the heating element moves relative to the housing. In other words, during retraction of the heating element, the housing stays stationary, while the heating element moves. Preferably, the heating chamber stays stationary, while the heating element moves during the retraction of the heating element from the heating chamber. During the retraction of the heating element from the heating chamber, the aerosol-generating article preferably remains stationary. Preferably, the heating element moves relative to the further elements of the aerosol-generating device during retraction of the heating element from the heating chamber. Exemplarily, the heating element moves relative to the power supply during retraction of the heating element from the heating chamber. The heating element may move relative to the controller during retraction of the heating element from the heating chamber. One or more of the power supply and the controller may be stationary, while the heating element may be configured movable for attracting the heating element from the heating chamber. Preferably, all components of the aerosol-generating device except for the heating element remain stationary during retraction of the heating element from the heating chamber.

The heating chamber may have a hollow tubular shape for insertion of an aerosol-generating article with a cylindrical shape resembling a conventional cigarette. The opening of the heating chamber for inserting the article may be circular. The heating element may be configured as a heating blade arranged centrally in the heating chamber.

The heating element may be pushed back into the heating chamber after retraction of the heating element. Retraction of the heating element may be utilized before insertion of the aerosol-generating article or before removal of a depleted article. Retracting the heating element from a used aerosol-generating article may reduce aerosol deposits and aerosol-generating substrate residues on the heating element and in the heating chamber. These effects may be achieved due to reduced friction between the heating element and the aerosol-generating article and the defined retraction movement of the heating element. Pushing the heating element into the heating chamber may be utilized after insertion of the article into the heating chamber. The heating element may penetrate into aerosol-generating substrate contained in the article during pushing and subsequently be operated for generating an aerosol.

The heating chamber may comprise an opening in the base of the heating chamber and the heating element may be configured to be retracted through the opening.

The heating element may be slidably arranged in the opening. During normal operation, the heating element may be attached to the device below the heating chamber and reach into the heating chamber through the opening. The heating element may be retracted by sliding the heating element through the opening and further into the aerosol-generating device away from the heating chamber. The heating element may be slided through the opening all the way during retraction of the heating element such that the heating element is no longer arranged in the heating chamber after retraction. The heating element may be retracted through the opening until only the tip of the heating element remains in the heating chamber. In this way, it may be prevented that aerosol-generating substrate enters the aerosol-generating device through the opening. The opening may be configured as a narrow slit. The narrow slit may enable movement of the heating element, when the heating element is configured as a heating blade, and may scrape off residues of aerosol-generating substrate from the heating element during movement of the heating element.

The device may further comprise a retraction mechanism connected to the heating element.

The retraction mechanism may be configured to facilitate the retraction of the heating element from the heating chamber. The retraction mechanism may be connected to the heating element in a way that the heating element can be moved by means of the retraction mechanism. The retraction mechanism may also facilitate pushing of the heating element back into the heating chamber.

The device may further comprise the power supply and the controller, wherein the controller may be configured to control the supply of power to the retraction mechanism.

The controller may comprise a processor. The controller may be connected with the power supply and the retraction mechanism. The power supply may be configured as a battery. The controller may comprise a retraction controller for controlling the retraction mechanism and a heating controller for separately controlling the heating element.

The retraction mechanism may be configured as an electrically driven mechanism comprising one of more of an electric motor, preferably a linear electric motor, a pneumatic mechanism, a hydraulic mechanism, an electromagnetic mechanism, a piezoelectric mechanism, an ultrasonic mechanism or a gravitational mechanism.

The retraction mechanism preferably facilitates a linear motion of the heating element. The linear motion of the heating element is preferably such that the heating element can be moved from the first position in the heating chamber to the second position essentially out of the heating chamber and within the aerosol-generating device.

The retraction mechanism may be configured as a mechanical mechanism comprising one of more of a slider mechanism, a screw mechanism, a cantilever mechanism, a push mechanism, a pull mechanism, a spring mechanism, an elastic mechanism, a roller mechanism and a gear mechanism or a magnetic mechanism or a temperature sensitive mechanism.

A temperature sensitive mechanism may be realized by a shape memory material, a bimetal or any other material that changes shape and/or dimension due to a temperature change. In such a configuration of the retraction mechanism, preferably a lower temperature after deactivation of the heating element would result in the retraction mechanism retracting the heating element from the heating chamber. Activation of the heater and therefore increase of temperature may result in the heating element being pushed into the heating chamber by means of the retraction mechanism heating up.

The heating element may comprise multiple heating zones. The heating zones may be configured for being heated to different temperatures. Different portions of the aerosol-generating substrate to be heated by the heating element may thus be heated. The different zones may be configured separately controllable and operable.

The retraction mechanism may comprise one or more of a shape memory alloy, a shape memory polymer, a shape memory ceramic and bimetal. The retraction mechanism may be configured to change its shape for retracting the heating element from and pushing the heating element into the heating chamber. The change of shape of the retraction mechanism may be induced by specific temperature ranges, light with specific wavelengths, applying electricity, applying a magnetic field, other physical triggers or chemical triggers.

The retraction mechanism may be configured to position the heating element between the first position, in which the heating element is not retracted, and the second position, in which the heating element is fully retracted. Intermediate positions may thus be realized by means of the retraction mechanism. These intermediate positions may for example be utilized to heat different sections of the aerosol-generating substrate in the aerosol-generating article. The retraction mechanism may be configured to position the heating element in fixed or continuous intermediate positions.

The retraction mechanism may comprise a support element and a guide, wherein the heating element may be connected to the support element, and wherein the support element may be slidably connected to the guide.

The support element may be configured for forming a base for the heating element. The support element may thus have a function to securely hold the heating element during retraction of the heating element. The guide may be configured for enabling a linear movement of the heating element away from the heating chamber (retraction) and back into the heating chamber (pushing or extension of the heating element). The guide consequently is preferably arranged along the longitudinal axis of the heating chamber or parallel to the longitudinal axis of the heating chamber. The guide is preferably arranged within the housing of the aerosol-generating device. The guide may be fixed, while the support element may be configured moveable. The connection between the guide and the support element may be realized by any known means such as a worm gear.

The retraction mechanism may comprise a biasing mechanism, preferably a spring, for biasing the heating element towards the heating chamber.

A biasing mechanism such as a spring may facilitate force acting upon the heating element biasing the heating element towards the heating chamber. Thus, when the retraction mechanism is not activated, the biasing mechanism may facilitate that the heating element is securely positioned within the heating chamber. Also, after the retraction mechanism has retracted the heating element from the heating chamber, the biasing mechanism may realize the heating element being pushed back into the heating chamber after the retraction mechanism is deactivated.

The device may comprise multiple heating elements connected to the retraction mechanism. The device may comprise multiple retraction mechanisms each being connected to one or more heating elements. Preferably, the heating chamber comprises multiple openings in the base of the heating chamber and the heating elements may be configured to be collectively retracted through the openings.

Multiple heating elements may be utilized and connected to a single support element. These multiple heating elements may be utilized for more uniformly heating the aerosol-generating substrate in the aerosol-generating article. When multiple heating elements are connected together to a single support element, all heating elements may preferably be retracted together from the heating chamber and pushed back into the heating chamber. Alternatively, multiple retraction mechanisms with respective support elements and respective heating elements may be provided. These separate retraction mechanisms may then be used to retract from or push into the heating chamber multiple heating elements separately from each other. This embodiment may be utilized for heating different sections of aerosol-generating substrate by means of different heating elements. Different heating schemes may be realized in this way.

The retraction mechanism may be configured to push the heating element into the heating chamber after retraction of the heating element from the heating chamber by the retraction mechanism.

The pushing of the heating element may be utilized after insertion of a fresh aerosol-generating article into the heating chamber by a user. Hence, the user can easily insert the aerosol-generating article into the heating chamber, because no sliding friction is created between the heating element and the inserted aerosol-generating article. After insertion of the aerosol-generating article, the heating element is pushed into the heating chamber thereby penetrating the aerosol-generating article. The heating element may be pushed into the heating chamber after activation of the heating element by which the heating element is heated. Clamping means may be provided for securely holding the aerosol-generating article within the heating chamber during pushing of the heating element into the heating chamber. The clamping means may be configured as a needle or an element similar to a brake shoe.

The device may further comprise an activation mechanism, preferably a push-button, wherein the heating element may be retracted from the heating chamber upon activation of the activation mechanism.

The activation mechanism may be a mechanism by which the user indicates that he wants to use the aerosol-generating device. The activation mechanism is thus preferably provided as a button. However, the activation mechanism may also have a different configuration such as a communication interface. The communication interface may be connectable to an external device such as a smartphone or a smartwatch so that the user may activate the activation mechanism externally by means of the external device.

The user may activate the activation mechanism before insertion of an aerosol-generating article into the heating chamber. The heating element may then be retracted from the heating chamber to ease insertion of the article into the heating chamber. Before operation, the user may use the activation mechanism for pushing of the heating element back into the heating chamber, thereby penetrating the article. After operation of the device and depletion of the article, the user may use the activation mechanism to retract the heating element from the heating chamber for removal of the depleted article.

The heating element may be centrally aligned within the heating chamber and may be configured retractable along the longitudinal central axis of the heating chamber.

The opening in the base of the heating chamber may comprise a cleaning element configured to remove residues from the heating element during retraction of the heating element from the heating chamber.

The cleaning element is preferably configured to remove unwanted residues from the surface of the heating element during retraction of the heating element from the heating chamber. The cleaning element may be fixed to the heating chamber. The cleaning element may be configured removable. The cleaning element preferably lies flush against the surface of the heating element such that unwanted residues of aerosol-generating substrate are scraped off of the surface of the heating element during retraction. The heating element may be configured to remove unwanted residues on the surface of the heating element by rubbing, brushing, scrapping, wiping or any other operation. The heating element may be arranged next to the opening at the base of the heating chamber. The cleaning element may have a ring shape. The cleaning element may comprise one or more of brushes, microfiber clove and foam. The cleaning element may surround the outer circumference of the heating element. The cleaning element may comprise a bead configured to directly contact the heating element and surround the outer circumference of the heating element.

The invention also relates to a method for retracting a heating element from a heating chamber of an aerosol-generating device. The method comprises the following steps:

i) providing an aerosol-generating device comprising a housing, a heating chamber configured to receive an aerosol-generating article containing aerosol-generating substrate and a heating element, wherein the heating element is arranged in the heating chamber, and wherein the heating element is configured to be arranged in a first position, in which the heating elements penetrates the aerosol-generating substrate, and configured to be arranged in a second position, in which the heating element is at least partly retracted from the heating chamber, and wherein the heating element is configured to move, during retraction from the heating chamber, relative to the housing; and ii) retracting the heating element from the heating chamber.

FIG. 1 shows the aerosol-generating device according to the present invention. The aerosol-generating device comprises a housing 10 with a heating chamber 12. Within the heating chamber 12, a heating element 14 can be arranged. In the left part of FIG. 1, FIG. 1A, the heating element 14 is retracted from the heating chamber 12. In the right part of FIG. 1, FIG. 1B, the heating element 14 is positioned within the heating chamber 12. In other words, the heating element 14 is pushed into the heating chamber 12 in FIG. 1B. An aerosol-generating article 16 comprising aerosol-generating substrate such as tobacco can be inserted into the heating chamber 12. When the heating element 14 is retracted from the heating chamber 12, the aerosol-generating article 16 does not contact the heating element 14 or only slightly contact the tip of the heating element 14. When the heating element 14 is pushed into the heating chamber 12, the heating element 14 penetrates into the aerosol-generating article 16.

The aerosol-generating device also comprises a retraction mechanism 18. The retraction mechanism 18 is configured for retracting the heating element 14 from the heating chamber 12 and pushing the heating element 14 into the heating chamber 12. The retraction mechanism 18 is controlled by means of a controller 20. The controller 20 may comprise different elements such as a retraction controller 22 for controlling the retraction mechanism 18. The controller 20 may also comprise a heating controller 24 for controlling the operation of the heating element 14. The heating controller 24 may be configured to activate the heating element 14 during operation of the aerosol-generating device and deactivate the heating element 14, when the aerosol-generating device is not operated. The controller 20 is connected to a power supply 26. The power supply 26 preferably is configured as a battery. The heating controller 24 controls the supply of electrical energy from the battery towards the heating element. The retraction controller 22 and the heating controller 24 are configured separately controllable. The heating element 14 may thus be retracted and pushed independent of the operation of the heating element 14.

The retraction mechanism 18 comprises a support element 28, to which the heating element 14 is connected. The support element 28 is connected to a guide 30 which is configured such that the support element 28 can slide along the guide 30 during retraction and pushing of the heating element 14. The guide 30 runs along the longitudinal axis of the heating element 14 such that the movement of the heating element 14 during retraction and pushing is also along or parallel to the longitudinal axis of the heating chamber 12. The guide 30 preferably comprises a sawtooth and the support element 28 a bevel gear to realize a worm drive.

FIG. 2 shows different embodiments of the retraction mechanism 18. In FIGS. 2A and 2B, a biasing element 32 configured as a spring is depicted for biasing the support element 28 of the retraction mechanism 18 towards the heating chamber 12. In this way, the heating element 14 is pushed into the heating chamber 12, when the retraction mechanism 18 is not operated. Also, a pushing of the heating element 14 into the heating chamber 12 is simplified after retraction of the heating element 12 from the heating chamber 14. In this regard, the biasing element 32 may push the heating element 14 back into the heating chamber 12, when the retraction mechanism 18 is deactivated. Also, the retraction mechanism 18 may aid together with the biasing element 32 to push the heating element 14 back into the heating chamber 12 and potentially into an aerosol-generating article 16. The biasing element 32 is connected to the support element 28 and the base of the heating chamber.

FIG. 2C shows an embodiment in which two separate heating elements 14 are provided but connected together to a single support element 28 of the retraction mechanism 18. Preferably two openings are provided in the base of the heating chamber 12 to facilitate retraction and pushing of the two heating elements 14.

In FIG. 2D, also two heating elements 14 are provided. In comparison to FIG. 2C, in the embodiment of FIG. 2D the two heating elements 14 are provided with separate retraction mechanisms 18. In this embodiment, the heating elements 14 can be retracted from and pushed into the heating chamber 12 separately from each other, for example for heating different portions of an inserted aerosol-generating article.

FIG. 2E shows an embodiment in which the embodiments shown 2C and 2D are combined. In this regard, two separate retraction mechanisms 18 are provided wherein one retraction mechanism 18 comprises one heating element 14 and one retraction mechanism 18 comprises two heating elements 14.

As desired, as many retraction mechanisms 18 as necessary can be provided with as many heating elements 14 as necessary.

Figures 3, 3A, 3B, 3C:
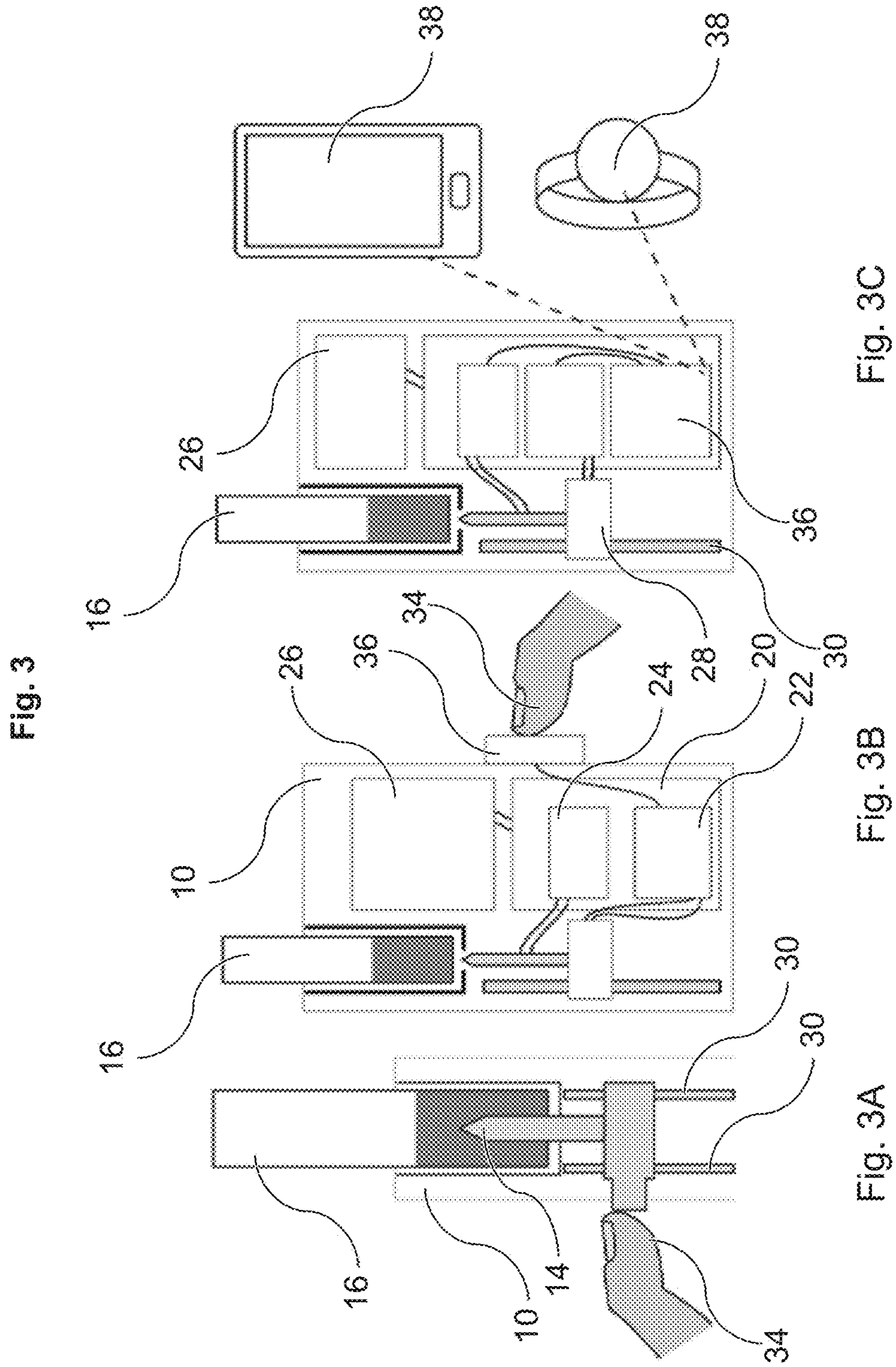
FIG. 3: the aerosol-generating device according to the present invention with different activation mechanisms.

FIG. 3 shows different embodiments of operating the retraction mechanism 18. In FIG. 3A, the retraction mechanism 18 is operated by a user 34. In this regard, the support element 28 comprises a tab which can be operated by a user 34. The user 34 can slide the support element 28 along the guides 30, thereby moving the heating element 14. Hence, the user 34 can manually retract the heating element 14 from the heating chamber 12 and push the heating element 14 back into the heating chamber 12. The tab may protrude through a slit in the housing 10 of the device to be accessible by a user, while the guides 30 and the rest of the support element 28 are arranged within the housing 10.

In FIG. 3B, the retraction mechanism 18 is operated by means of an activation mechanism 36 such as a button. Upon operation of the button, the user can retract the heating element 14 from the heating chamber 12 or pushes the heating element 14 back into the heating chamber 12.

FIG. 3C shows an embodiment in which the activation mechanism 36 is realized by means of a communication interface together with an external device such as a smartphone or a smartwatch 38.

Figures 4, 4A, 4B, 4C:
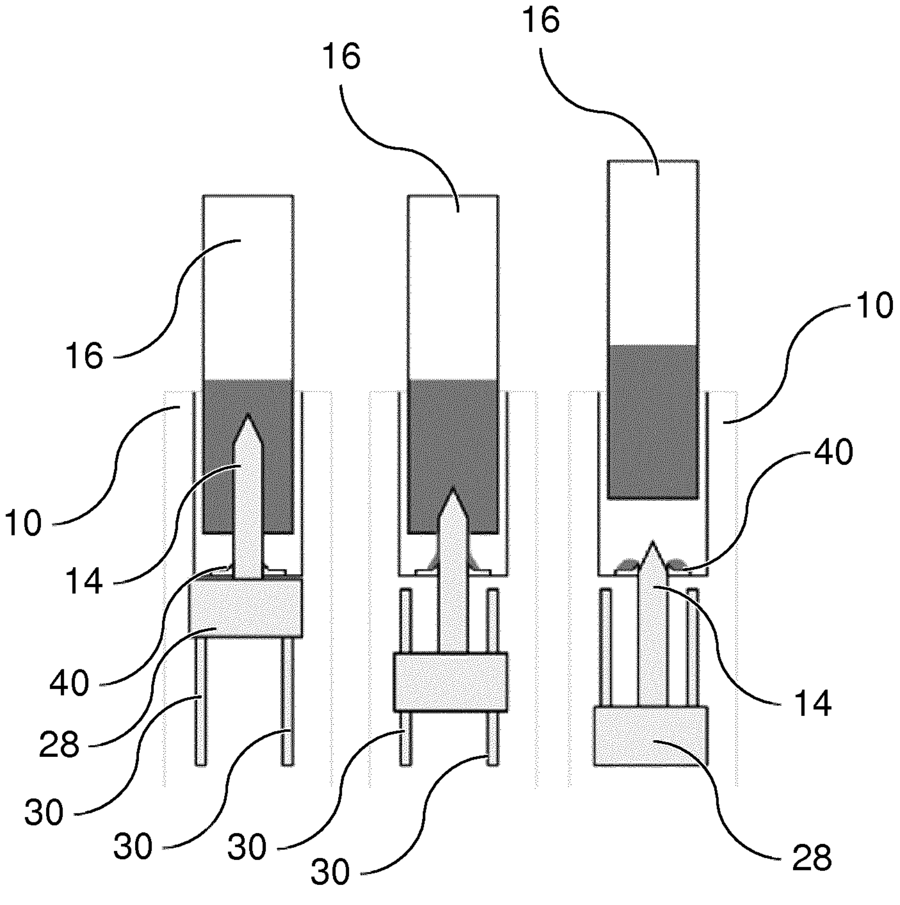
FIG. 4: the aerosol-generating device according to the present invention with a cleaning element.

FIG. 4 shows a cleaning element 40 for cleaning the heating element 14 during retraction from and pushing into the heating chamber 12. The cleaning element 30 is arranged around the opening at the base of the heating chamber 12. The cleaning element 30 lies flush against the heating element 14 such that residues of aerosol-generating substrate or aerosol are automatically removed from the heating element 14 during retraction of the heating element 14 from the heating chamber 12 and into the aerosol-generating device. By the cleaning element, it is also prevented that aerosol-generating substrate or other residues enter the aerosol-generating device through the opening in the base of the heating chamber 12. As can be seen in FIG. 4C, the heating element 14 is not fully retracted from the heating chamber 12. The tip of the heating element 14 remains in the heating chamber 12. The heating element 14 may be retracted to align with the base of the heating chamber.

Figure 5:
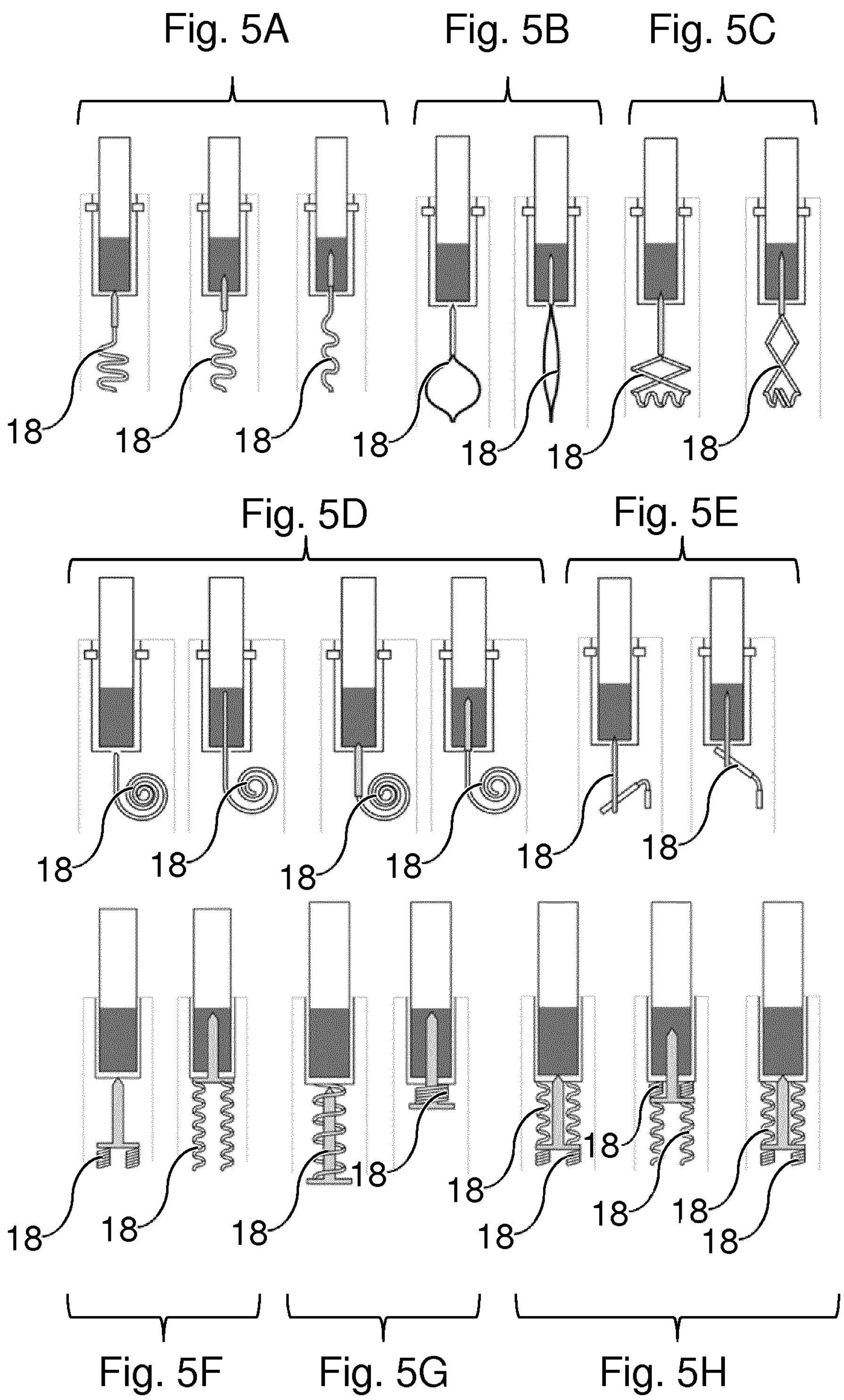
FIG. 5: configurations of the retraction mechanism in which the retraction mechanism comprises shape memory material.

FIG. 5 shows different embodiments of the retraction mechanism 18, in which the retraction mechanism 18 comprises shape memory material such as a shape memory alloy, a shape memory polymer or a shape memory ceramic. A bimetal may also be utilized. FIG. 5A shows an embodiment, in which the retraction mechanism 18 comprises a shape memory material. This material allows the heating element to be moved between different positions. In a first position, the heating element is partly or completely retracted from the heating chamber. In a second position, the heating element is partly or entirely inserted into the heating chamber and penetrates in the aerosol-forming substrate of an aerosol-forming article. In a third position, the heating element is fully pushed into the heating chamber and heats other portions of the aerosol-forming substrate in the aerosol-generating article. In all embodiments shown in FIG. 5, the retraction mechanism 18 is operated by heating and cooling of the retraction mechanism 18. Preferably, the retraction mechanism 18 pushes the heating element 12 into the heating chamber 10 upon heating up and retracts the heating element 12 from the heating chamber 10 upon cooling down. The retraction mechanism 18 is preferably heated by the supply of electrical energy from the power supply 26 to the retraction mechanism 18 by the controller 20.

FIG. 5B shows an embodiment, in which the retraction mechanism 18 comprises multiple curved strips. When the strip is heated, the curvature of the strip changes, thereby pushing the heating element towards the aerosol-forming substrate. FIG. 5C shows an embodiment, in which the retraction mechanism 18 comprises a shape memory element configured to push or pull a cantilever to move the heating element. FIG. 5D shows an embodiment, in which the retraction mechanism 18 comprises a wound-up coil of shape memory material. When heated, the coil unwinds and moves the heating element 12. FIG. 5E shows an embodiment, in which the retraction mechanism 18 comprises a shape memory material and a hinge. The hinge changes the position of a cantilever mechanism, which moves the heating element. FIG. 5F shows an embodiment, in which the retraction mechanism 18 comprises multiple shape memory elements such as coils or springs which work together to adjust the position of the heating element. FIG. 5G shows an embodiment, in which the retraction mechanism 18 comprises one or more shape memory springs or coils that can pull the heating element into the heating chamber by contraction. The coil is arranged around a central axis element of the retraction mechanism 18. FIG. 5H shows an embodiment, in which the retraction mechanism 18 comprises multiple shape memory components configured to perform opposite actions. One shape memory element or group of elements moves the heating element from one position to another. Another shape memory element or group of elements moves the heating element back to the original position.

The invention claimed is:

1. An aerosol-generating device for generating an inhalable aerosol, the aerosol-generating device comprising:
- a housing;
- a heating chamber configured to receive an aerosol-generating article containing an aerosol-generating substrate; and
- a heating element disposed in the heating chamber,
- wherein the heating element is configured to be arranged in a first position, in which the heating element penetrates the aerosol-generating substrate, and in a second position, in which the heating element is at least partly retracted from the heating chamber, and
- wherein the heating element is further configured to move, during retraction from the heating chamber, relative to the housing.

2. The aerosol-generating device according to claim 1,
- wherein the heating chamber comprises an opening in a base of the heating chamber, and
- wherein the heating element is further configured to be retracted through the opening.

3. The aerosol-generating device according to claim 1, further comprising a retraction mechanism connected to the heating element.

4. The aerosol-generating device according to claim 3, further comprising a power supply and a controller,
- wherein the controller is configured to control a supply of power to the retraction mechanism.

5. The aerosol-generating device according to claim 3, wherein the retraction mechanism is configured as a mechanical mechanism comprising one or more of a slider mechanism, a screw mechanism, a cantilever mechanism, a push mechanism, a pull mechanism, a spring mechanism, an elastic mechanism, a roller mechanism, and a gear mechanism or a magnetic mechanism or a temperature sensitive mechanism.

6. The aerosol-generating device according to claim 3, wherein the retraction mechanism comprises one or more of a shape memory alloy, a shape memory polymer, a shape memory ceramic, and bimetal.

7. The aerosol-generating device according to claim 3,
- wherein the retraction mechanism comprises a support element and a guide,
- wherein the heating element is connected to the support element, and
- wherein the support element is slidably connected to the guide.

8. The aerosol-generating device according to claim 3, wherein the retraction mechanism comprises a biasing mechanism configured to bias the heating element towards the heating chamber.

9. The aerosol-generating device according to claim 8, wherein the biasing mechanism is a spring.

10. The aerosol-generating device according to claim 3, further comprising multiple heating elements connected to the retraction mechanism, or multiple retraction mechanisms each being connected to one or more heating elements.

11. The aerosol-generating device according to claim 10, wherein the heating chamber comprises multiple openings in a base of the heating chamber, and the multiple heating elements or the one or more heating elements are configured to be collectively retracted through the multiple openings.

12. The aerosol-generating device according to claim 3, wherein the retraction mechanism is configured to push the heating element into the heating chamber after retraction of the heating element from the heating chamber by the retraction mechanism.

13. The aerosol-generating device according to claim 1, further comprising an activation mechanism, wherein the heating element is retracted from the heating chamber upon activation of the activation mechanism.

14. The aerosol-generating device according to claim 13, wherein the activation mechanism is a push-button.

15. The aerosol-generating device according to claim 1, wherein the heating element is centrally aligned within the heating chamber and is configured to be retractable along a longitudinal central axis of the heating chamber.

16. The aerosol-generating device according to claim 2, wherein the opening comprises a cleaning element configured to remove residues from the heating element during retraction of the heating element from the heating chamber.

17. A method for retracting a heating element from a heating chamber of an aerosol-generating device, the method comprising the following steps:

i) providing an aerosol-generating device comprising a housing, a heating chamber configured to receive an aerosol-generating article containing an aerosol-generating substrate and a heating element, wherein the heating element is disposed in the heating chamber, wherein the heating element is configured to be arranged in a first position, in which the heating element penetrates the aerosol-generating substrate, and in a second position, in which the heating element is at least partly retracted from the heating chamber, and wherein the heating element is further configured to move, during retraction from the heating chamber, relative to the housing; and ii) retracting the heating element from the heating chamber.

* * * * *